United States Patent
Rzadki et al.

(10) Patent No.: US 7,544,108 B2
(45) Date of Patent: *Jun. 9, 2009

(54) POWER GENERATION, DISTRIBUTION, AND ON-BOARD POWER SUPPLY SYSTEM FOR LOW-EMISSIVE SURFACE MARINE (NAVY) SHIPS OF DIFFERENT CLASSES AND SIZES

(75) Inventors: Wolfgang Rzadki, Glinde (DE);
Matthias Schulze, Lüneburg (DE);
Ronald Völzke, Nürnberg (DE); Bernd Wacker, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 90 days.

This patent is subject to a terminal disclaimer.

(21) Appl. No.: 10/579,746

(22) PCT Filed: Nov. 12, 2004

(86) PCT No.: PCT/EP2004/052944

§ 371 (c)(1),
(2), (4) Date: May 18, 2006

(87) PCT Pub. No.: WO2005/049418

PCT Pub. Date: Jun. 2, 2005

(65) Prior Publication Data

US 2007/0077830 A1    Apr. 5, 2007

(30) Foreign Application Priority Data

Nov. 19, 2003 (DE) ................ 103 53 967

(51) Int. Cl.
*B63H 21/17* (2006.01)
*B63H 21/22* (2006.01)

(52) U.S. Cl. ............................. 440/6; 440/1
(58) Field of Classification Search ...................... 440/6
See application file for complete search history.

(56) References Cited

U.S. PATENT DOCUMENTS 5,417,597 A * 5/1995 Levedahl ........................ 440/6

(Continued)

FOREIGN PATENT DOCUMENTS

EP    0 536 876 A    4/1993

(Continued)

OTHER PUBLICATIONS

Wolfgang Rzadki: Emissionsfreies Schiff am Horizont gesichtet. In: Siemens Erfinderpreis 2000, Pressemitteilung Seite 8, Münche, 4. Dez. 2000; http://w4.siemens.de/ct/de/news/2000 2001/zt200012001d.pdf.

(Continued)

*Primary Examiner*—Jesus D Sotelo
(74) *Attorney, Agent, or Firm*—Harness, Dickey & Pierce PLC

(57) ABSTRACT

Disclosed is a power generation, distribution, and on-board power supply system for low-emission surface marine (navy) ships of different classes and sizes. The system is embodied as an equipment segment and includes at least one cruising speed drive unit, which can be supplied with electrical power from a DC network, and at least one auxiliary drive unit, e.g. a hydrojet, which can be supplied with electrical power from an AC network and can be connected as required. The DC network and the AC network are configured in such a way that power can be mutually transferred.

39 Claims, 9 Drawing Sheets

U.S. PATENT DOCUMENTS

| | | | | |
|---|---|---|---|---|
| 5,678,647 | A | * | 10/1997 | Wolfe et al. .............. 180/65.3 |
| 5,969,435 | A | * | 10/1999 | Wilhelm .................. 307/64 |
| 6,188,139 | B1 | * | 2/2001 | Thaxton et al. ............ 290/4 R |
| 7,172,474 | B2 | * | 2/2007 | Rzadki et al. .............. 440/6 |
| 2005/0009418 | A1 | * | 1/2005 | Ries et al. ................ 440/6 |

FOREIGN PATENT DOCUMENTS

| | | |
|---|---|---|
| EP | 0 902 518 A | 3/1999 |
| EP | 1 022 218 A | 7/2000 |
| EP | 1 537 018 B1 | 6/2005 |
| WO | WO 02/15361 A1 | 2/2002 |
| WO | WO 02/24523 A | 3/2002 |
| WO | WO 02/057 132 A1 | 7/2002 |
| WO | WO 02/057133 A2 | 7/2002 |
| WO | WO 02/058206 A | 7/2002 |
| WO | WO 03/047963 A1 | 6/2003 |
| WO | WO 2004/007278 A | 1/2004 |

OTHER PUBLICATIONS

C. Bourne, T. Nietsch, Dave Griffihs, Jon Morley: Application of Fuel Cells in Surface Ships. 2001; http://test.netgates.co.uk/nre/pdf/Microsoft%20Word%20-%20F0300207.pdf.

Gary M. Jebsen, Office of Naval Research: Electric Warship Technology Overview. May 2, 2001. http://www.marmach.org/pdf/minutes/arlington010522/elecwarship.pdf.

Dr. Albert J. Tucker: Opportunities & Challenges in Ship Systems & Control at ONR. In: IEEE Conference on Decision & Control, Dec. 4, 2001. http://www.usna.edu/EPNES/ONR CDC Dec. 2001.pdf.

German Office Action dated Nov. 16, 2006.

* cited by examiner

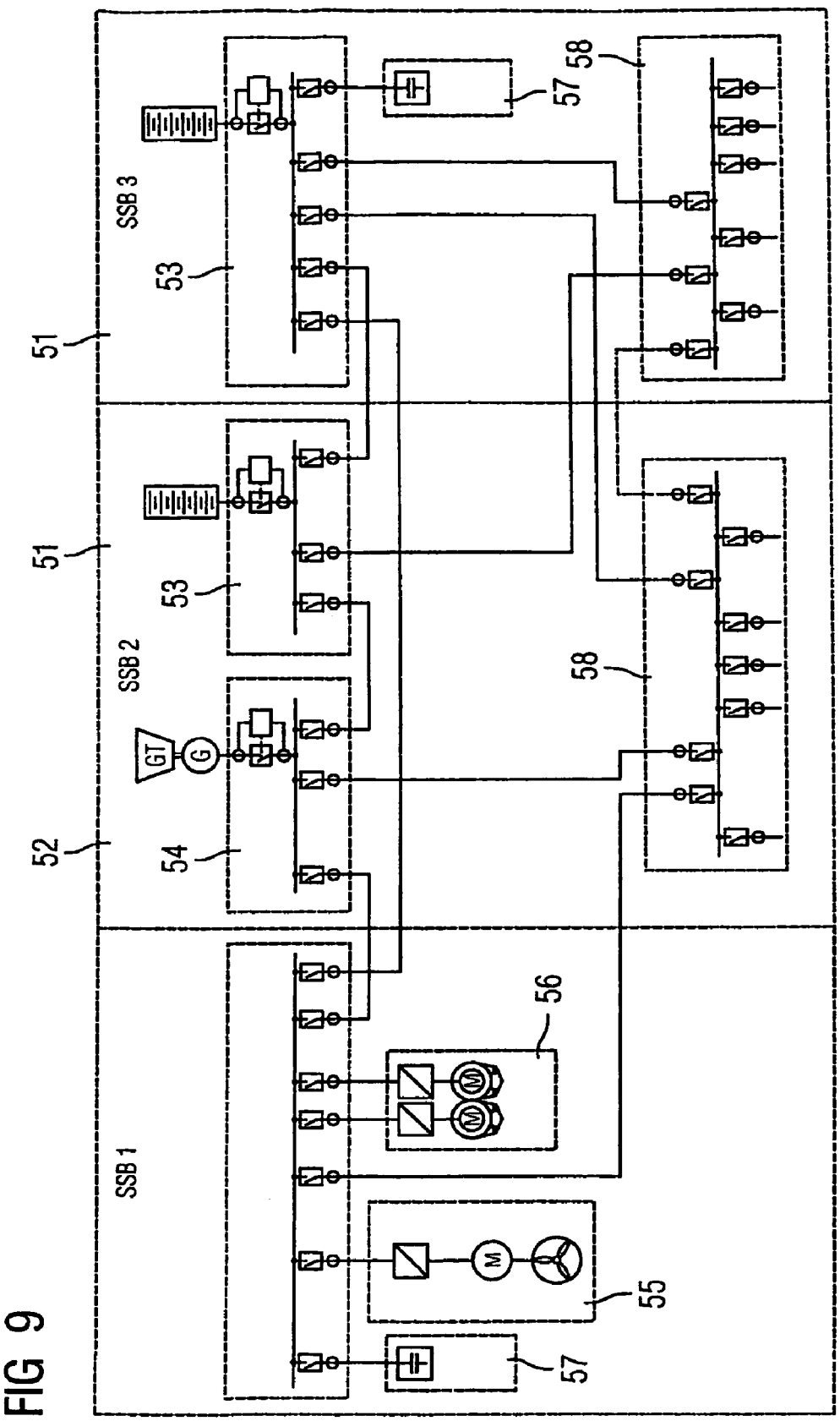

POWER GENERATION, DISTRIBUTION, AND ON-BOARD POWER SUPPLY SYSTEM FOR LOW-EMISSIVE SURFACE MARINE (NAVY) SHIPS OF DIFFERENT CLASSES AND SIZES

This application is the national phase under 35 U.S.C. § 371 of PCT International Application No. PCT/EP2004/052944 which has an International filing date of Nov. 12, 2004, which designated the United States of America and which claims priority on German Patent Application number 103 53 967.0 filed Nov. 19, 2003, the entire contents of which are hereby incorporated herein by reference.

FIELD

The invention generally relates to a power generation, distribution and on-board electrical power supply system for low-emission surface navy vessels of various classes and sizes, having at least one cruise propulsion system for example. It may relate to an electrical steerable propeller propulsion system, for example, which can be supplied with electrical power preferably from a DC network, and/or one having at least one additional propulsion system, for example a waterjet propulsion system, which can be switched on when required and can be supplied with electrical power from an AC network. In this case, the DC network and the AC network may be configured in such a manner as to allow power to be transferred in both directions between them.

BACKGROUND

Electrically excited synchronous generators are conventionally used to generate electrical power on navy vessels, and are driven by diesel engines or gas turbines. The power is transmitted using alternating-current technology. The propulsion is provided by way of diesel engines, gas turbines, electric motors or by way of a combination of them, in which case the motors or engines drive one or more propellers via a shaft, and provide forward propulsion for the vessel. Both fixed-pitch propellers and variable-pitch propellers are used in this case.

The power generation units are normally arranged approximately amidships. One example of the conventional technology is the HNLMS "LPD Rotterdam" of the Royal Netherlands Navy. This vessel is equipped with four diesel generator sets, which are switched onto two main switch panels.

Forward propulsion is provided by four electric motors. Two of these motors, in each case, act on a shaft via a step-down transmission. For redundancy reasons, two motors are connected, crossed over, to the respective other medium-voltage switchboard.

The propulsion systems that are already known have the disadvantage that they cannot be designed to be largely emission-free, that is to say they have a high infrared signature and electromagnetic signature. A further disadvantage is that the propulsion systems which are already known can be rendered inoperable by a hit from only one missile, for example by a medium-sized rocket amidships.

SUMMARY

At least one embodiment of the invention includes an object of specifying an electrical power generation, distribution and on-board electrical power supply system which can easily be matched to widely differing operating states, including emission-free operating states, and which can be kept serviceable in the event of failure of subareas of its electrical power supply network systems. One aim in this case is to take particular account of the fact that modern navy vessels have two propulsion devices which can operate independently of one another, for example a POD in the stern and a waterjet propulsion system amidships. One example is disclosed in WO 02/057132 A1.

A further aim is also to take account of the subdivision of the vessel into vessel protection sections or areas, in which case even the failure of one or two vessel protection sections is not intended to adversely affect the operability of the vessel to such a significant extent that the vessel can no longer move away from the hit location and can at least partially carry out its task. An object may be achieved in that the power generation, distribution and on-board electrical power supply system according to at least one embodiment of the invention has at least one DC network and one AC network, which are designed in such a manner as to allow power to be transferred in both directions between them. In this case, the DC network is associated with a POD propulsion system or an in-board electrical propulsion system, in particular with an HTS motor. Further, the AC network is associated with an additional electrical propulsion system, for example a waterjet propulsion system, driven in particular by way of an HTS motor. This results in propulsion system redundancy which is far better than previous propulsion system redundancies.

In this case, one refinement of at least one embodiment of the invention provides for the DC network to have at least one fuel cell module for generation of electrical power, in particular a fuel cell module which at least partially consumes reformer hydrogen. The use of a fuel cell module which generates direct current results in largely low-emission cruise propulsion, since only the exhaust air and the exhaust gases from the reformer are produced, and the otherwise normal exhaust gas plume does not exist. It is particularly advantageous for the exhaust air and the exhaust gases from the reformer to be injected via injectors into the water surrounding the vessel, thus preventing horizontal infrared location.

A further refinement of at least one embodiment of the invention provides for the fuel cell module to include air-breathing fuel cells which are connected to one another, in particular fuel cells with different dynamics. This results in a fuel cell embodiment which is particularly suitable for on-board operation and for cruise propulsion, and for which there is no need to carry or produce pure oxygen on-board.

In this case, use is highly advantageously made of the particular advantages of fuel cells, which are characterized by high electrical efficiency, a good partial-load behavior, low emissions and extremely low noise development, and which are suitable both for decentralized and centralized applications, such as those for the electrical propulsion system for vessels according to at least one embodiment of the invention.

In one specific refinement of at least one embodiment of the present invention, the DC network preferably has a plurality of fuel cell modules, each of about 1 MW to 10 MW, with each fuel cell module preferably being variably including a large number of interconnected fuel cells, preferably of 0.1 MW to 0.3 MW, in particular of 0.12 to 0.15 MW.

A large number of different embodiments of fuel cells with a large number of different operating temperatures are known, so that it is possible to use the large number of different types to form fuel cell blocks which comply with the various dynamic requirements on-board navy vessels, in which case low-temperature fuel cells which have good dynamics are advantageously used for a changing, dynamic load on the DC network, and high-temperature fuel cells whose dynamics are not as good are advantageously used for the basic load on the DC network.

According to at least one embodiment of the invention, the fuel cells can be operated with a reaction gas from a reformer, in particular a diesel, methanol, high-octane gasoline and/or natural-gas reformer and with air. When operating with air, the oxygen side of the fuel cells contains approximately 21% oxygen. When operating with the reaction gas from a reformer, the so-called reformer gas, the hydrogen side of the fuel cell contains nitrogen or carbon dioxide mixed in it. Thus, the PEM fuel cells as are used for highly dynamic requirements according to at least one embodiment of the invention are no longer designed in a dead-ended form either on the oxygen side or on the hydrogen side.

In one specific refinement of at least one embodiment of the invention, the AC network has at least one synchronous generator which is driven by a gas turbine, for example using HTS technology, in order to generate electrical power.

The DC network and the AC network are advantageously a 1 kV to 15 kV network. According to one particularly advantageous refinement of at least one embodiment of the invention, the DC network and the AC network supply electrical power to the on-board network in the vessel. The electrical propulsion system according to at least one embodiment of the present invention advantageously has a DC intermediate circuit for coupling the on-board network to the DC network and to the AC network. Power is advantageously transmitted both from the DC network and from the AC network to the DC intermediate circuit, and thus to the on-board network, via DC lines. Thus, it is easy to transfer power into both networks depending on the requirement. AC/DC converters are used in the AC network for this purpose.

In a further refinement of at least one embodiment of the invention, converters are used in the electrical on-board network to convert the electrical power that is made available to the on-board network to an appropriate AC voltage, since the loads to be supplied via the on-board network are generally AC loads.

In a further advantageous refinement of at least one embodiment of the invention, glass-fiber lines, which are arranged in a fail-safe configured form, are used to drive the assemblies and components of the propulsion system and for data interchange. In this case, both rings and star-shaped configurations may be chosen, in the same way as in the case of the power supply lines.

A plurality of fuel cell modules are advantageously distributed in the ship or boat. Switching devices and control devices in the ship or boat can thus be connected and interconnected in a very simple manner. Particularly in the case of navy vessels, it must be possible to maintain and ensure the electrical power supply in the event of a hit. Overall, at least one embodiment of the invention results in a vessel with a good survival capability and whose electrical equipment can react variably to all situations which can occur after hits.

A further refinement of at least one embodiment of the invention highly advantageously provides for the network to have current limiting appliances in the power generation, distribution and on-board electrical power supply system, which are in the form of HTS (high-temperature superconductor) current limiters and/or semiconductor switches, and by means of which the reaction of voltage dips in the event of short circuits, including network elements which are not affected, is restricted to a time interval in the region of a few milliseconds, in particular is limited to <1 ms, and voltage dips such as these can thus be restricted to the respectively affected network element. In an example embodiment, the HTS current limiters may have a superconductor composed of YbaCuO compounds, which is designed using thin-film technology and uses liquid nitrogen as the cryogenic liquid.

The networks in navy vessels are, of course, in the form of island networks which are fed by at least two generators, fuel cell systems or else high-power batteries or combinations of them. These include electrical distribution systems, some of which have high operating currents, since low-voltage switching systems of <1 kV are frequently used. The electrical systems of networks such as these are subject to stringent thermal and dynamic requirements in the case of a short-circuit event.

Because of the configuration of the electrical protection concept, voltage dips must be expected after hits, whose effect may extend to a blackout of the electrical network. Thus, the generator switches will also trip in certain situations. In a fully electrical vessel, which by definition is the case with the navy vessel, this results in lack of maneuverability since it is no longer possible to supply the vessel propulsion systems; this can lead to loss of the vessel and must be avoided in all cases.

Particularly in the case of navy vessels, multiple faults frequently occur, for example in the event of one or more hits after making contact with an enemy, for example by guided missiles, in which case various sections or switchboards are affected in a manner which cannot be predicted in order to make it possible to carry out appropriate manual or automatic switching operations.

If a voltage dip occurs throughout the entire electrical network, the electronic automation and control equipments are influenced in the range from a few tens of milliseconds to several thousand milliseconds, for example the reaction time in the main area may be between 0.03 and 6 seconds. If the electronic equipment does not have an uninterruptible supply, for example by way of a static transfer switch from a battery via inverters, this will lead to failure of the electronic equipment which will necessitate, for example, restarting of the operating systems, and this takes more time. Thus, after a hit, immediate switching operations are required not only for the power supply lines but also for the electronic equipment.

The measures stated in the following text are known from the prior art, and can be used to improve the availability and the fail-safety of the electrical network designed in this way. The electrical power generation units as well as the load units are split between different vessel protection sections. Individual switching system sections are connected to one another by couplings which are arranged directly in a switching system in a panel in the form of a circuit breaker panel, or connecting lines, in the case of which a circuit breaker is provided in each switching system, and they are connected to a cable run.

The electrical networks are in the form of ring networks or hierarchical networks, in some cases with a high degree of interconnection, with switching devices, for example in the form of automatic high-speed switching devices, being provided in order to satisfy the redundancy requirements in the planned operation. However, in some circumstances, the known measures are not adequate.

According to at least one embodiment of the invention, even when short circuits occur, any damage to the electronic equipment is advantageously reliably to be precluded by automation and control techniques. This is achieved by the measures that have already been described above and in particular by those which will be described in the following text.

It is particularly advantageous for the electrical network to have current limiting appliances, which are in the form of HTS current limiters and interact with a semiconductor switch and/or circuit breaker, by which it is possible to protect in particular energy sources in the form of electrical power generation units and/or energy stores.

The use of an HTS current limiter between two network elements makes it possible to keep the sound network element free from any reactions from a voltage dip caused by a short circuit in the coupled network element. The sound network element can thus remain in operation without any interruption and without restarting the power supply devices and loads connected to it. The interaction of the HTS current limiter, which acts as primary protection, with secondary protective devices which act on the existing conventional mechanical circuit breakers or electronic semiconductor switches makes it possible to selectively detect the fault or faults even in the network element which is affected by the short circuit.

At least one embodiment of the invention provides for the power generation, distribution and on-board electrical power supply system to be designed, at least in part, as a standard equipment segment for navy vessels of various sizes. This advantageously allows standardization of the corresponding components to be achieved. This leads on the one hand to considerable cost advantages and also to advantages in the training of personnel, in the production of manuals and operating instructions etc.

This is also true when standard POD propulsion systems are used as cruise propulsion systems, or when standard HTS motors or generators are used. Overall, this thus results in navy vessel equipment which considerably improves not only the survivability but also the operation, servicing and maintenance of navy vessels.

BRIEF DESCRIPTION OF THE DRAWINGS

Further features and advantages of the invention will be explained in more detail in the following text with reference to example embodiments which are illustrated in the figures and, in the same way as the claims, include further details, which are also significant to the invention.

In the figures:

FIG. 9 shows an outline illustration of a network according to at least one embodiment of the invention for a small unmanned combat boat.

DETAILED DESCRIPTION OF THE EXAMPLE EMBODIMENTS

Figure 1:
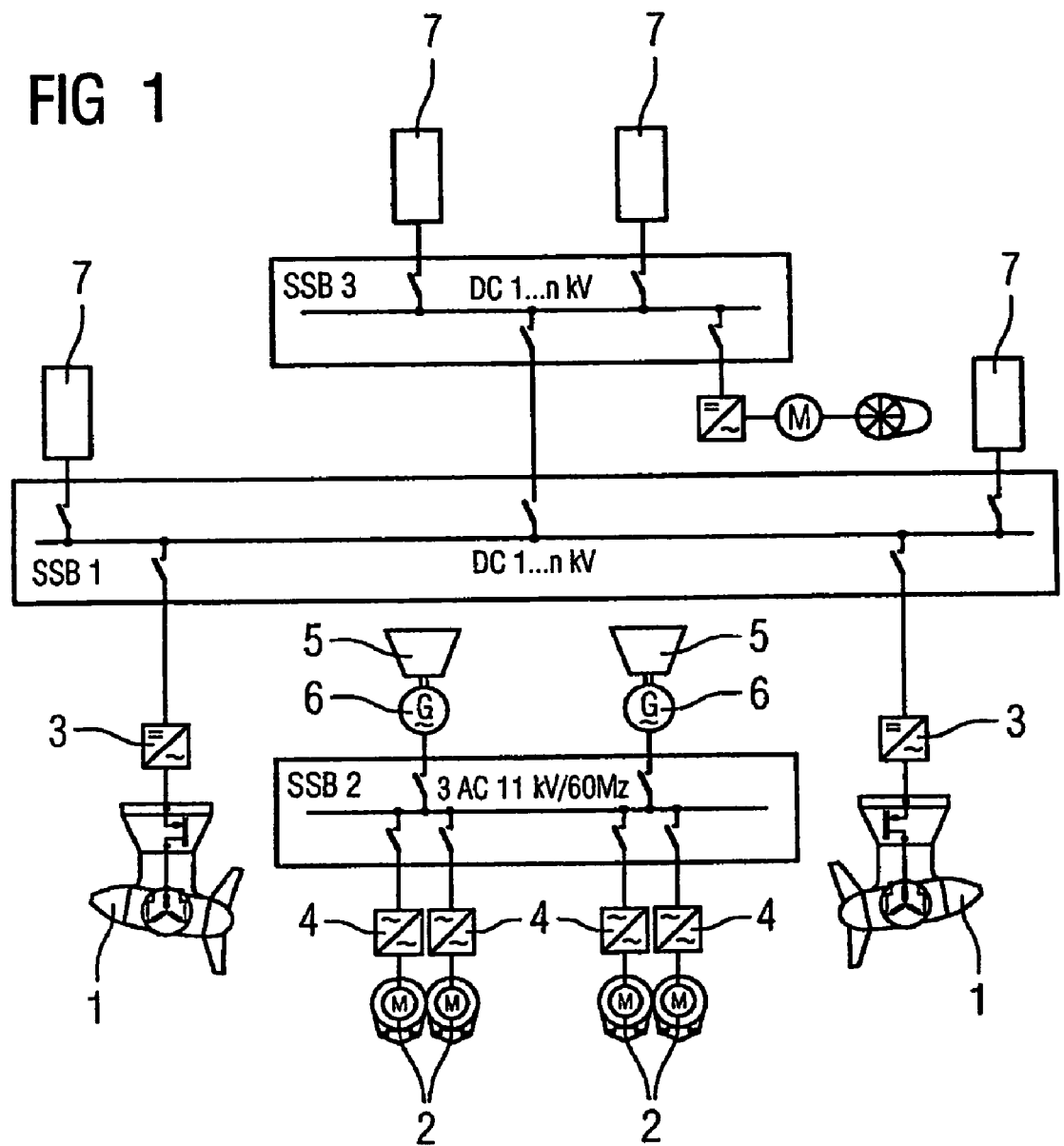
FIG. 1 shows the fundamental concept of the electrical propulsion system according to at least one embodiment of the present invention.

FIG. 1 shows the propulsion concept of the electrical propulsion system for vessels. The electrical propulsion system has four propulsion elements which can be operated independently of one another as a function of the operating state, two steerable propeller propulsion systems 1 and two waterjet propulsion systems 2 of redundant design. In the case of the electrical propulsion system for vessels as illustrated in FIG. 1, the following operating states are provided:

In a speed range up to 20 knots, or when traveling at a low-noise cruise speed, the vessel is propelled and controlled only by the two steerable propeller propulsion systems 1. By way of example, the steerable propeller propulsion systems 1 have a propulsion power of about 5 to 10 MW. The electrical power for the steerable propeller propulsion systems 1 and for the on-board network is for this operating state generated in a low-noise manner by fuel cells 7 interacting with, for example, diesel reformers, as will be explained in more detail in the following text.

In a speed range above 20 knots, the two waterjet propulsion systems 4 (twin waterjets), which are of redundant design, are switched on, with a power of about 10 to 20 MW each. The electrical power for the waterjet propulsion systems 4 is generated by two three-phase synchronous generators 6, in particular designed using HTS technology, which are each driven by a gas turbine.

The power distribution of the thrust power which is required to propel the vessel forwards between the steerable propeller propulsion systems 1 and the waterjet propulsion systems 4 (twin waterjets) is based on efficiency-optimized aspects.

The steerable propeller propulsion systems 1 advantageously draw their power from a DC voltage network (SSB1) in a range from DC 1 to . . . nkV. Inverter units 3, including, for example, HV-IGBT power cards and diode power cards, convert the DC voltage to AC voltage of a variable voltage and frequency. Each of the two steerable propeller propulsion systems 1 includes the following components:

power supply cabinet
    converter cabinet group with power section, open-loop and closed-loop control section, closed-cycle cooling system
    azimuth control
    azimuth propulsion
    steerable propeller Furthermore, a steerable propeller, in particular designed to be retractable, is advantageously arranged in the bow area and includes two modules, the azimuth module and the propulsion module. This results in a maneuvering propulsion system which is also suitable as a standby propulsion system for long-distance journeys.

The azimuth module is fitted to an appropriately machined flange above the water line, is screwed to it and is sealed. This type of installation for azimuth propulsion systems is known by the expression "well installation". The azimuth module includes the following subsystems:

electro-hydraulic control system
    pivoting bearing
    supporting cone
    auxiliary operation propulsion module transmitter unit main and secondary power as well as signal transmission switch boxes The propulsion module contains the actual propulsion system, that is to say the electric-motor propeller unit. The propulsion module can be subdivided into the following assemblies:

electric motor, for example a synchronous motor with an HTS rotor membrane couplings propeller shaft propeller propeller shaft bearing propeller shaft seal propeller shaft brake underwater housing shaft A synchronous motor, including the stationary stator and the rotor which is connected to the shaft, is advantageously used as the electrical drive motor for the propeller. The rotor advantageously has windings using HTS technology. The stator may be introduced, for example, into the underwater housing via a force-fitting connection. The heat is extracted from the stator into the surrounding seawater via this connection, advantageously a shrink connection. The stator contains a three-phase winding system. The winding ends are passed to the connecting area via a rail system. The motor is equipped with sensors for monitoring and for control. The already described module and motor design are in principle known from the merchant marine and have essentially also been adopted for navy vessels. In this case, in particular, it is envisaged that the motor for navy vessels will be designed using HTS technology; a cooling system is arranged in the shaft for this purpose.

The electrical power is transmitted from the converter 3, which is located in the vessel, to the motor, which is located in the propulsion module which can rotate, via cables and a slipring unit. The slipring unit allows unlimited rotational movements. The connections between the converter and the slipring, and between the slipring and the motor connecting rail system, are provided by cables and are designed to be shock-resistant. The motor for navy vessels is also advantageously designed to be shock-resistant.

The components of the converter system 3 are combined in a cabinet group, and the components comprise a power section, an open-loop and closed-loop control section, and a closed-cycle cooling system. The motor for the propeller propulsion system 1 is fed by an inverter unit 3 which is arranged in the vessel. The inverter unit 3 produces a voltage whose frequency, amplitude and phase angle are controlled. The voltage form is in each case matched to the demand by the motor and the higher-level control system at any given time.

In the case of the example embodiment of the electrical propulsion system as illustrated in FIG. 1, a SIMAR Drive PWM (Siemens Marine Drive Pulse Width Modulation) is used, for example, for the inverter units 3. The inverter units 3 are fed from the DC voltage network SSB1 in the range from DC 1 . . . nkV. The inverter units 3 include, for example, HV-IGBT or IGCT power cards and diode power cards, and are fitted in a cabinet system. They allow four-quadrant operation of the propeller propulsion systems 1. Operation in both directions is thus possible. The associated open-loop and closed-loop control system is designed to be completely digital and is made up of group assemblies, for example comprising the SIMADYN and/or SIMATIC S7 standard system.

By way of example, the open-loop and closed-loop control system for the propeller propulsion systems 1 includes the following functional groups:

open-loop and closed-loop control (TCU) close to the converter integrated in the power section, vessel-specific open-loop and closed-loop control The inverter units 3 are cooled by way of water and, for example, contain a closed water circuit which is filled with deionized water. This pure-water circuit is connected to the IGBT or IGCT modules and diode modules of the inverter units 3. The heat losses in the closed-cycle cooling system are dissipated in a water/heat exchanger to a fresh-water circuit, which can be connected to the vessel fresh-water system as required.

Figure 2:
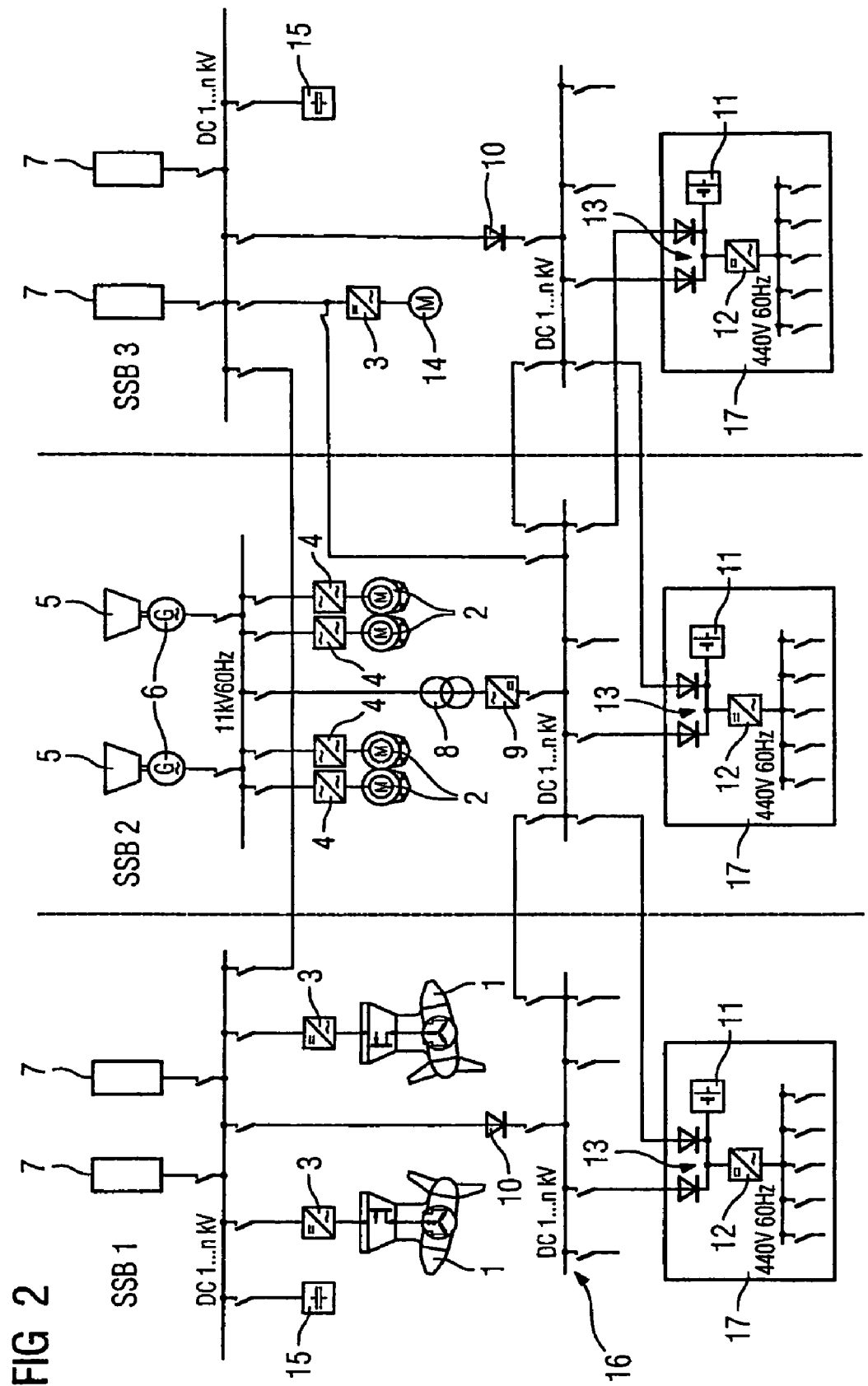
FIG. 2 shows the fundamental concept of the networks in the electrical propulsion system according to at least one embodiment of the present invention.

FIG. 2 shows the network system of the electrical propulsion system as shown in FIG. 1. The main network is used for forward propulsion of the vessel and includes a DC voltage network DC 1 . . . nkV network and an AC voltage network, in the present case, by way of example, a medium-voltage network of 11 kV/50 Hz or 60 Hz. Half of the DC network is in each case located in the vessel protection areas 1 and 3 (SSB1 and SSB3). The two network elements are connected to one another by way of a connecting line which is operated in a closed form via appropriate switch positions during normal operation.

The electrical power for the low-noise operating state is provided by four, for example 4.5 MW, fuel cell modules which each, for example, comprise 30 fuel cells with a rating of 0.15 MW each. The fuel cell modules in particular, but not necessarily exclusively, comprise so-called PEM fuel cells, which each comprise a stack of series-connected membrane electrode units and bipolar plates, referred to as stacks, and to this extent are of a relatively simple design. They can be designed to be shock- and vibration-resistant and are thus particularly suitable for use on navy vessels. Their fundamental design is well known from the literature.

The power is generated for the DC network, for example as already stated, via in each case two 4.5 MW fuel cells 7, which supply electrical power to the steerable propeller propulsion systems 1 via inverter units 3. By way of example, the steerable propeller propulsion systems in this case have a motor rating of 5 to 10 MW. Furthermore, the on-board network. 17 is generally likewise supplied with electrical power via the on-board network intermediate circuit 16 from the fuel cells 7 via the DC network.

As can also be seen in FIG. 2, the fuel cells 7 supply the vessel weapon systems via the DC network, including high-energy pulse or laser weapons, as well as supplying propulsion motors via appropriate converters; in the present case the propulsion system 14 for the lateral thruster or so-called bow thruster (see FIG. 1).

The medium-voltage network, which is in the form of an AC network, is advantageously located in the vessel protection area 2 (SSB2) and is supplied with electrical power by way of two gas turbines/synchronous generator units each, for example, of 16 MW. The AC network feeds the waterjet propulsion systems 2, which are in the form of twin waterjets.

Furthermore, the on-board network intermediate circuit 16 and, via it, the on-board network 17 are supplied with electrical power from the AC network as required, for which purpose the AC network is provided with a downstream converter 9 for connection to the on-board network intermediate circuit by way of a transformer 8. This power bridge has a particular role in terms of the fail-safety of the electrical system since it makes it possible to deal with the failure of power generation units. Furthermore, the waterjets can highly advantageously be started via this power bridge without having to start up the gas turbine generator sets. This therefore allows emission-free starting of the navy vessel that is provided with the system until an adequate speed is reached in order to introduce the exhaust gases from the gas turbines or from any diesel units which may be used instead of the gas turbines via exhaust-gas inlet chambers into the water surrounding the vessel.

As already explained, the electrical propulsion system has a DC intermediate circuit 16 for coupling the on-board network 17 to the DC network and to the AC network. The DC intermediate circuit in this case allows an autonomous on-board network supply 17 within the three vessel protection areas SSB1, SSB2 and SSB3. The network elements in the individual vessel protection areas SSB1 and SSB3 are supplied with electrical power directly from the DC network via rectifiers 10. The rectifiers 10 in this case prevent short circuits being fed back to the DC network, thus providing a safe power supply for the propeller propulsion systems 1, the weapon systems 15 and the lateral thruster 14.

In the vessel protection area 2 (SSB2), the on-board network 17 is supplied with electrical power via the DC intermediate circuit 16. The AC network in the vessel protection area 2 (SSB2) has a transformer 8 with fed-back converters 9 for feeding the DC intermediate circuit 16, which produces a DC voltage from the AC network, for example an 11 kV/60 Hz AC propulsion network, which is provided for forward propulsion by the waterjet propulsion systems 2. The transformer 8 ensures DC isolation between the AC network and the DC network. As already stated, the AC network and the DC network are connected to one another via this connection, which is designed in such a way that electrical power can be transferred in both directions in it.

The three DC networks in the on-board network 17 are connected to one another by way of connecting lines, which are open during normal operation. In the event of failure or partial failure of one of the power generators that are provided for operation of the propulsion systems, or of their networks, the supply of electrical power to the on-board network 17 is ensured by way of the parallel operation of the DC intermediate circuit that is provided via the connecting lines. The on-board networks 17 in the individual vessel protection areas SSB1, SSB2 and SSB3 have an inverter 13 on the input side, which converts the 1 . . . nkV DC voltage to the on-board network voltage, that is to say the three-phase 60 Hz 440 V AC (in accordance with STANAG 100). A transformer is connected between the converter 12 and the AC network of the on-board network (AC network) for DC voltages of >1 kV.

Each inverter 12 (converter) in the on-board network 17 has two power feeds. The main feed is provided from the DC intermediate circuit (on-board network intermediate circuit) 16 in the respective vessel protection area SSB. The standby feed is provided via the connecting lines from the respective DC intermediate circuit 16 in the adjacent vessel protection area SSB. This ensures a redundant supply for the on-board network 17.

Rectifier diodes 13 in each of the feeds advantageously prevent feedback in the direction of the DC intermediate circuit or in the direction of the DC network or AC network. Loads can also advantageously be transferred without any interruption from the main feed to the standby feed. The switches for the main feed and the standby feed for the respective on-board networks can be switched without any interruption to the vessel protection areas SSB1, SSB2 and SSB3 by means of the DC intermediate circuit 16.

In order, other than by circuitry measures, to prevent the resultant voltage interruptions from short circuits, or switching processes from the DC network or the AC network and the steerable propeller propulsion systems 1 and waterjet propulsion systems 1, being transferred to the on-board network 17, energy stores 11 with a DC output are provided for the on-board networks 17. These are arranged between the input of the inverter 12 and the output of the rectifier diodes 13. The rectifier diodes 13 advantageously prevent feedback to short circuits on the network side, as already explained.

The electrical propulsion system as shown in FIGS. 1 and 2 highly advantageously allows not only all of the power generators to be operated at the same time but also all of the forward propulsion components to be switched on at the same time. For relatively low-speed propulsion states, the various propulsion devices can be switched on as required, in which case the power generator units are likewise used as required.

The separation and splitting of the propulsion networks (DC network and AC network for the propulsion systems 1 and 2) and the main group distribution into the three vessel protection areas SSB1, SSB2 and SSB3 mean that there is a high probability of in each case one propulsion system and at least 66% of the on-board network supply still being serviceable in the event of a hit. In this case, the hit may be sufficiently serious that only the vessel structure still remains in its area. The navy vessel still nevertheless remains maneuverable and can move away from the hit location.

Figure 3:
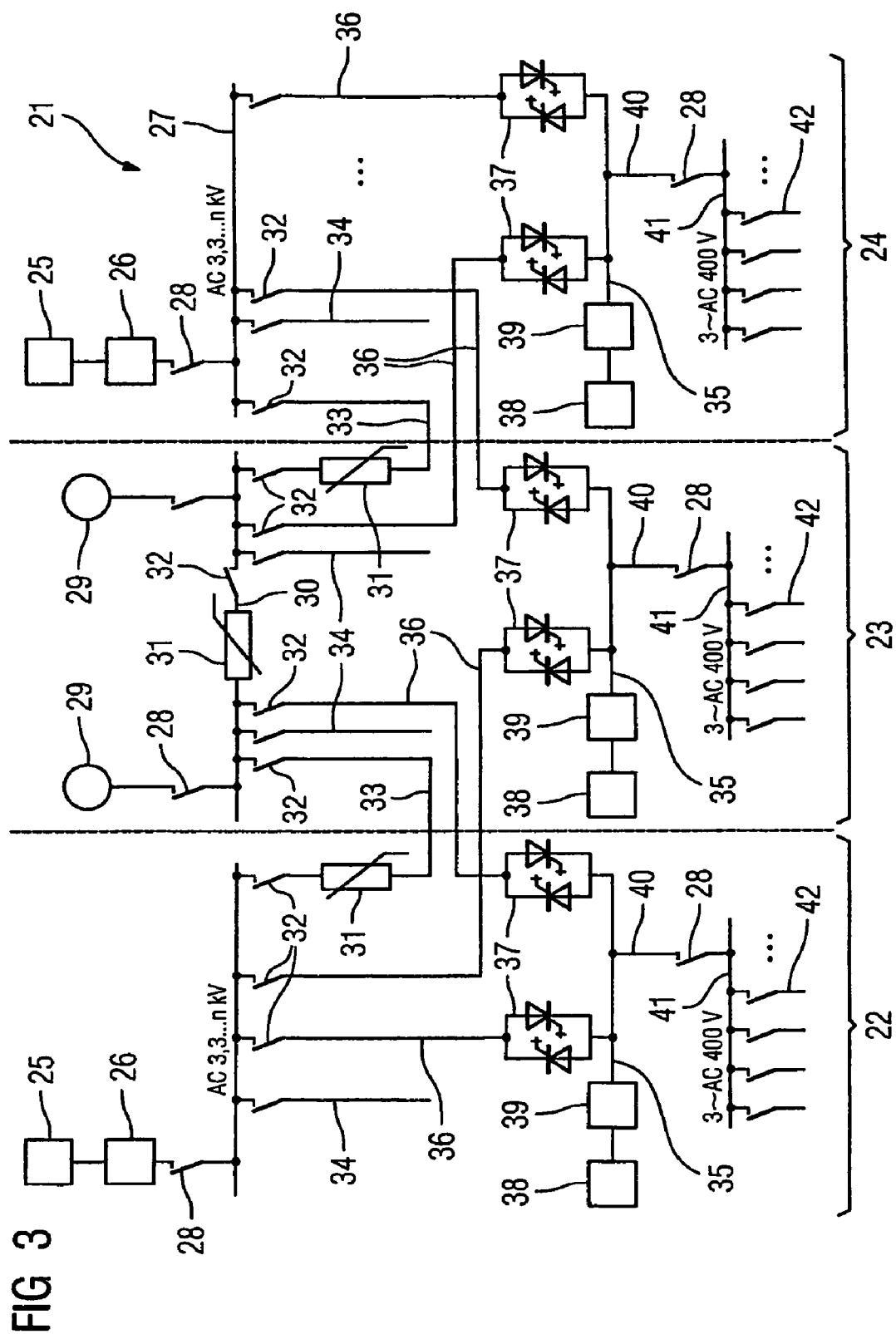
FIG. 3 shows an outline illustration of a first embodiment of an electrical network according to at least one embodiment of the invention for the system.

An electrical network 21 as shown by way of example in FIG. 3 is used on-board navy vessels and is likewise subdivided—in the described exemplary embodiment—into three vessel protection areas 22, 23 and 24.

At least one fuel cell unit 25 is in each case provided in the vessel protection area 22 and in the vessel protection area 24 as an electrical power generation unit. This fuel cell unit 25, which generates direct current, feeds electrical power via a inverter 26 to an AC main network 27, and a circuit breaker or load interrupter switch 28 is provided between the inverter 26 and the main network 27.

Two generators 29 are provided as electrical power generation units in the vessel protection area 23 and feed electrical power into the main network 27, in each case via a circuit breaker or load interrupter switch 28. In the vessel protection area 23, the main network 27 has a network coupling 30 in which a current limiting appliance in the form of an HTS current limiter 31 is arranged, with an associated circuit breaker 32. Two network elements are formed by means of the network coupling 30 in the vessel protection area 23, one of which is in each case associated with one of the two generators 29.

A network connecting line 33 is in each case provided between the vessel protection area 22 and the vessel protection area 23, as well as between the vessel protection area 23 and the vessel protection area 24, by means of which the main network 27 is connected or can be connected across the boundaries between the vessel protection areas 22, 23 and 24. An HTS current limiter 31 is in each case also provided in the two network connecting lines 33 that are shown in FIG. 3, each with an associated circuit breaker 32 in the respective two vessel protection areas 22, 23 or 23, 24. The vessel propulsion units, which are not shown in this figure, can be supplied with electrical power from the main network 27. As is shown in principle in FIG. 3, this is done by means of outgoers 34, which connect the vessel propulsion units, which are not shown, to the main network 27.

Furthermore, the electrical network shown in FIG. 3 has on-board network intermediate circuits 35, one of which is provided in each vessel protection area 22, 23, 24 in the example embodiment shown in FIG. 3. The on-board network intermediate circuits 35 are connected via outgoers 36 to the main network 27, with each on-board network intermediate circuit 35 being connected to the main network 27 by way of two outgoers 36, and the outgoers 36 which are associated with an on-board network intermediate circuit 35 being connected to the main network 27 in different vessel protection areas 22, 23, 24.

For example, the on-board network intermediate circuit 35 in the vessel protection area 22 is connected to the main network 27 by way of an outgoer 36 in the vessel protection area 22 and by way of a further outgoer 36 in the vessel protection area 23. The on-board network intermediate circuit 35 in the vessel protection area 23 is connected by way of an outgoer 36 to the main network 27 in the vessel protection area 22, and by way of an outgoer 36 to the main network 27 in the vessel protection area 24. The on-board network intermediate circuit 35 in the vessel protection area 24 is connected by way of one outgoer to the main network 27 in the vessel protection area 24 and by way of one outgoer 36 to the main network 27 in the vessel protection area 23.

A semiconductor switch 37 for bidirectional current is arranged in each outgoer 36 by way of which an on-board network intermediate circuit 35 is connected to the main network 27, and has an associated circuit breaker 32. Furthermore, an energy store 38 is provided in each on-board network intermediate circuit 35 and is connected to the respective on-board network intermediate circuit 35 via an inverter 39, which can optionally be equipped with a transformer. The on-board network intermediate circuits 35 are connected by way of outgoers 40, in each of which a circuit breaker 28 is provided, to on-board network main groups, from which load outgoers 42 lead to individual loads which are not illustrated.

Figure 4:
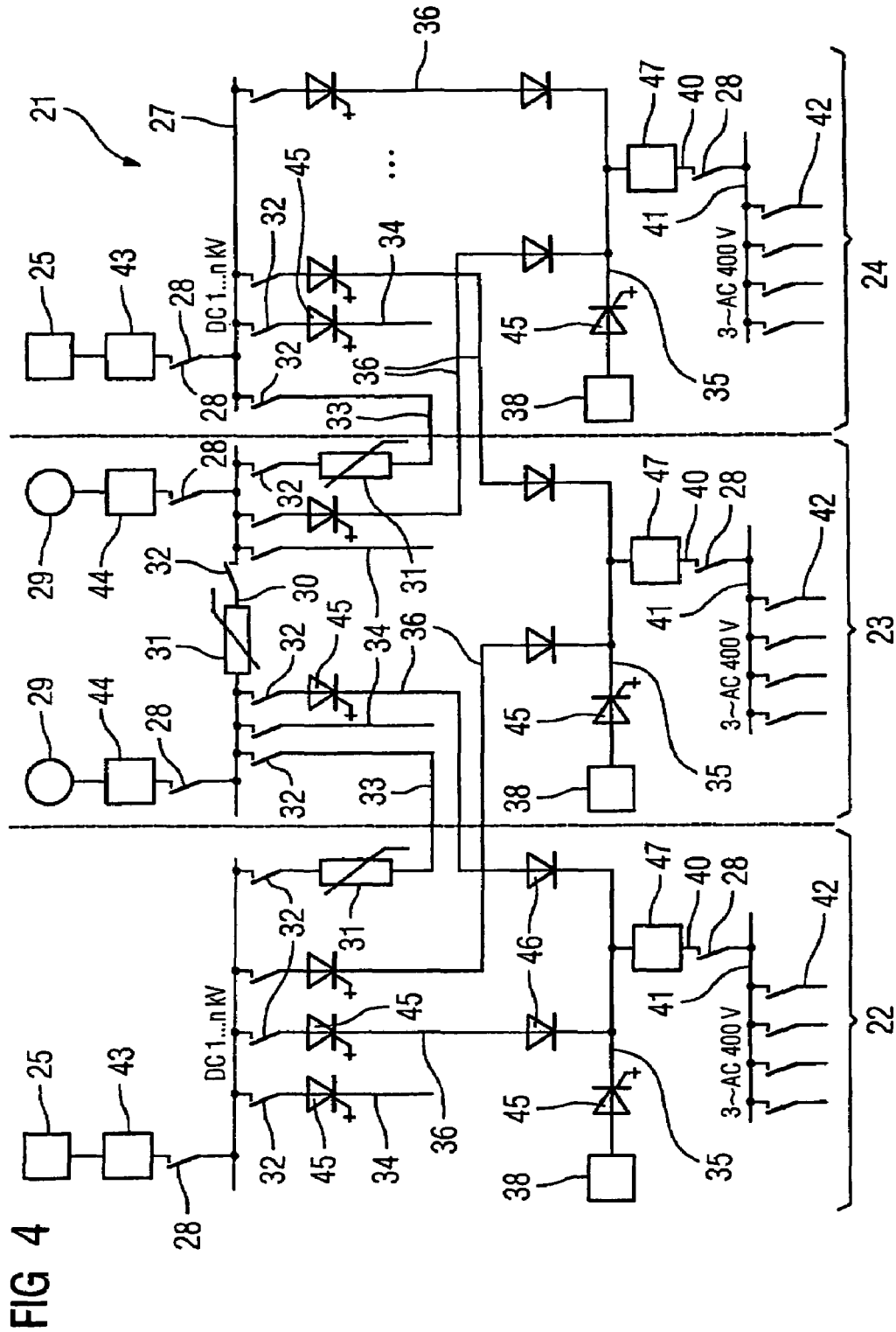
FIG. 4 shows an outline illustration of a second embodiment of an electrical network according to at least one embodiment of the invention for the system.

The electrical network 21 which is shown by way of example in FIG. 4 has a main DC network, which is likewise subdivided into the three vessel protection areas 22, 23, 24, corresponding to the embodiment shown in FIG. 3.

A DC/DC converter and a DC/DC step-up controller 43 are associated with each fuel cell unit 25 in the vessel protection areas 22 and 24, via which the fuel cell units 25 feed electrical power into the DC 1 . . . nkV main network 27. Correspondingly, the two generators 29 which are provided in the central vessel protection area 23 are connected via rectifiers 44 to the main network 27. Each electrical power generation unit 25, 29 also has an associated circuit breaker or load interrupter switch 28.

The embodiment of the main network 27 with the network coupling 30 provided in the vessel protection area 23 and with the two network connecting lines 33 between the vessel protection area 22 and the vessel protection area 23, or between the vessel protection area 23 and the vessel protection area 24, corresponds to that of the electrical network 21 shown in FIG. 3.

The vessel propulsion units which are not shown in FIG. 4, are supplied with electrical power via the outgoers 34 from the main network 27. It should be noted that the two outgoers 34 which are arranged in the vessel protection area 22 and in the vessel protection area 24 and lead to the vessel propulsion units are provided with semiconductor switches 45 for unidirectional current, each of which has an associated circuit breaker 32. Furthermore, the three on-board network intermediate circuits 35 are supplied with electrical power from the main DC network 27.

For this purpose, the on-board network intermediate circuit 35 in the vessel protection area 22 is connected via an outgoer 36 to the main network 27 in the vessel protection area 22, and via an outgoer 36 to the main network 27 in the vessel protection area 23. A semiconductor switch 45 for unidirectional current is arranged in conjunction with a circuit breaker 32 and a diode 46 in each of these two outgoers 36, with the diode 46 being an optional component, which is used for decoupling of the lines between different vessel protection areas in the event of a fault.

The on-board network intermediate circuit 35 in the vessel protection area 23 is likewise connected via two outgoers 36, configured as described above, to the main network 27 in the vessel protection area 22 and in the vessel protection area 24. In a corresponding manner, the on-board network intermediate circuit 35 in the vessel protection area 24 is connected via two outgoers 36, configured as described above, to the main network 27 in the vessel protection area 23 and in the vessel protection area 24.

The on-board network intermediate circuits 35 in the vessel protection areas 22, 23, 24 each have an associated energy store 38, which is charged and discharged via a semiconductor switch 45 for unidirectional current. The on-board network intermediate circuit 35 in each vessel protection area 22, 23, 24 is connected via an outgoer 40 to three 440 V 3-phase 60 Hz on-board network main groups 41, with one inverter or step-down controller 47 being arranged in conjunction with a circuit breaker 28 in each outgoer 40. The individual loads are supplied with electrical power from the on-board network main groups 41 via the load outgoers 42.

In the electrical networks 21 explained in more detail in FIGS. 3 and 4, the network elements which are arranged in the various-vessel protection areas 22, 23, 24 are connected to one another in a suitable manner. In the event of a short circuit in the vessel protection area 22, the short-circuit current component from the vessel protection area 23 is limited by the HTS current limiter 31 in the network connecting line 33 between the vessel protection area 22 and the vessel protection area 23; only the limited current flows through this network connecting line 33 between the vessel protection area 22 and the vessel protection area 23, without there being any detectable voltage dip in the vessel protection area 23 and the vessel protection area 24. The additional magnitude of the limited current must be taken into account in the graded protection of the generator switch, that is to say if appropriate by way of current through the generator switch. A corresponding situation is known to those skilled in the art.

Graded outgoer switching is possible by way of the semiconductor switches 37 and 45 in the two outgoers 36, by means of which the on-board network intermediate circuit 35 in the first vessel protection area is connected to the main network 27; provided that the voltage dip can be kept short, the main network 27 can also be maintained, if required, in the vessel protection area 22.

Fundamentally, it is also possible to protect the sub-distribution boards 41 using the criterion of current by way of semiconductor switches, or else conventionally via current/time grading, in which case the protective measures introduced are chosen on the basis of importance.

The HTS current limiter 31 can be used to disconnect the network connecting line 33 between the vessel protection area 22 and the vessel protection area 23 in a serious situation; this can be switched on again immediately after confirming the faulty outgoer by way of the semiconductor switch 37 or 45.

In the superconducting state, each HTS current limiter 31 has a negligibly small electrical resistance, which cannot be measured. In the case of a current which is above the rated current, the electrical resistance of the HTS current limiter 31 rises suddenly, until it changes over from its superconducting state to its normally conductive state. The HTS current limiter or its superconductor then assumes a finite resistance, until it is cooled down again.

In an electrical power network, the HTS current limiter 31, as in the example embodiments described above, is used in conjunction with a DC-isolating element with a disconnection capability; in the case of the example embodiments, the circuit breaker 32 is provided as such. It is also possible to use load interrupter switches for this purpose, if required.

A combination of an HTS current limiter, a semiconductor switch and a circuit breaker or load interrupter switch may be advantageous for protection of an electrical power generation unit or of a load.

The example embodiments of the electrical network 21 according to at least one embodiment of the invention as shown in FIGS. 3 and 4 are marine vessel networks which may be used not only on navy vessels but also on coastguard boats, fishery protection boats, that is to say on all possible vessels which carry out jurisdictional tasks on the high seas, and may be fired at. The combination of AC and DC networks as illustrated in FIG. 4 may be regarded as a preferred variant.

By way of example, fuel cells, gas turbine sets and diesel generator sets may be used as electrical power generation units. The energy stores 38 may, for example, be in the form of batteries, capacitors, flywheel generators, superconducting magnetic energy stores etc., with all of the energy stores mentioned having the common feature in the case of the preferred variant as shown in FIG. 4 that they must be connected to the associated load level via semiconductor switches 45 in order to feed in spare energy. Various voltage levels, for example for transmission lines, are possible within the scope of at least one embodiment of the invention, in each case dependent on the field of use and task of the vessel to be equipped.

The vessel network has a grounding and potential system which is designed in accordance with one of the variants based on VDE DIN and/or IEC, with the vessel network preferably having an isolated star point for AC medium or low voltage, and with an isolated system (IT network) likewise being possible for DC voltage networks. The isolated system is preferred because a ground short on one phase does not immediately lead to a short circuit.

The HTS current limiters may be arranged at energy sources, for example at generators, batteries, fuel cells or the like, although it is preferable to arrange them in couplings or connecting lines. The semiconductor switches may likewise be arranged at energy sources, for example generators, batteries, fuel cells, in couplings or connecting lines; however, semiconductor switches such as these can preferably be arranged in outgoers with a unidirectional current direction, in which case they are designed so as to allow graded protection.

FIGS. 5 to 9 show the various refinements of the system, in an example form, as a function of the vessel sizes for various navy vessels.

Figure 5:
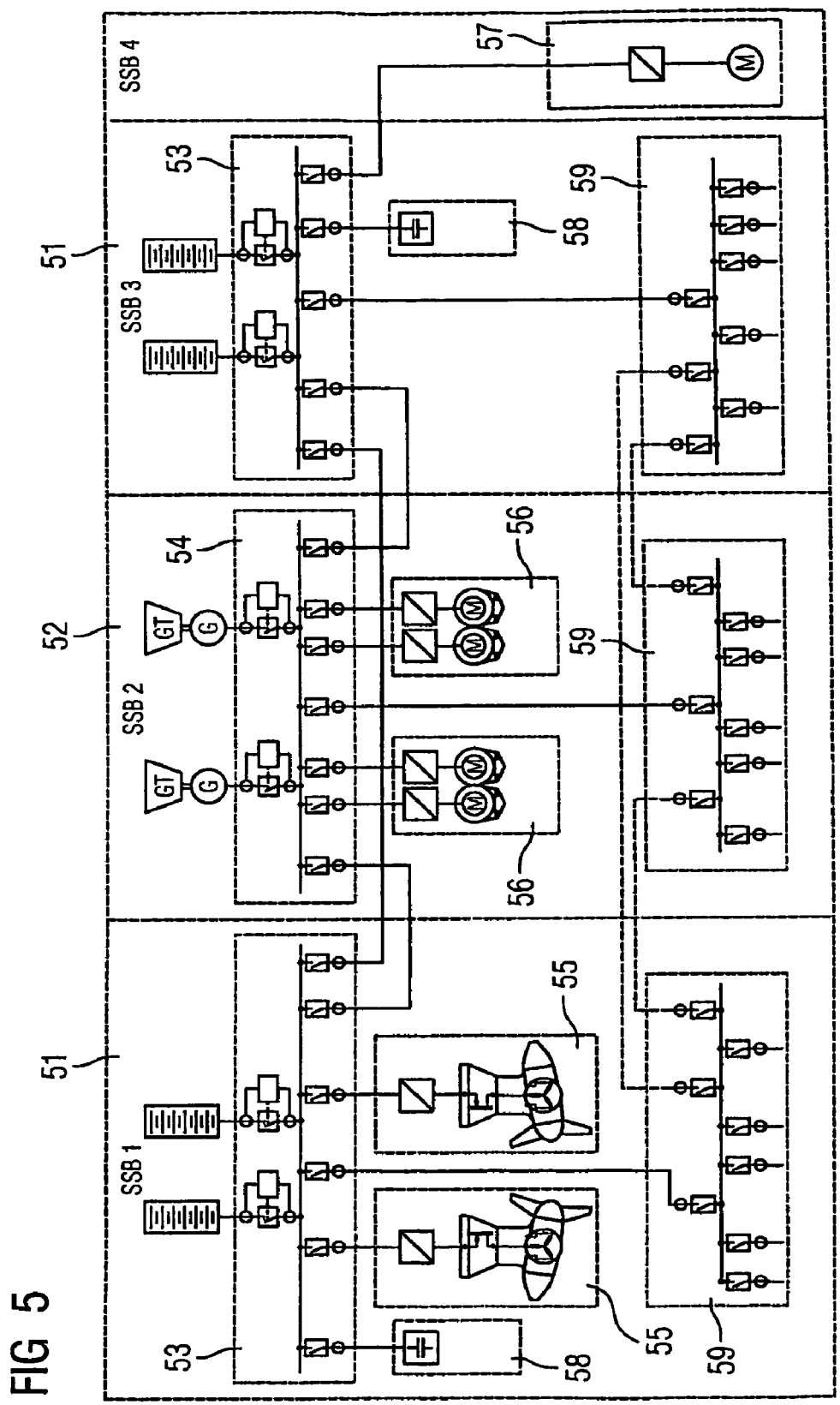
FIG. 5 shows an outline illustration of an electrical network according to at least one embodiment of the invention for a frigate.
Figure 6:
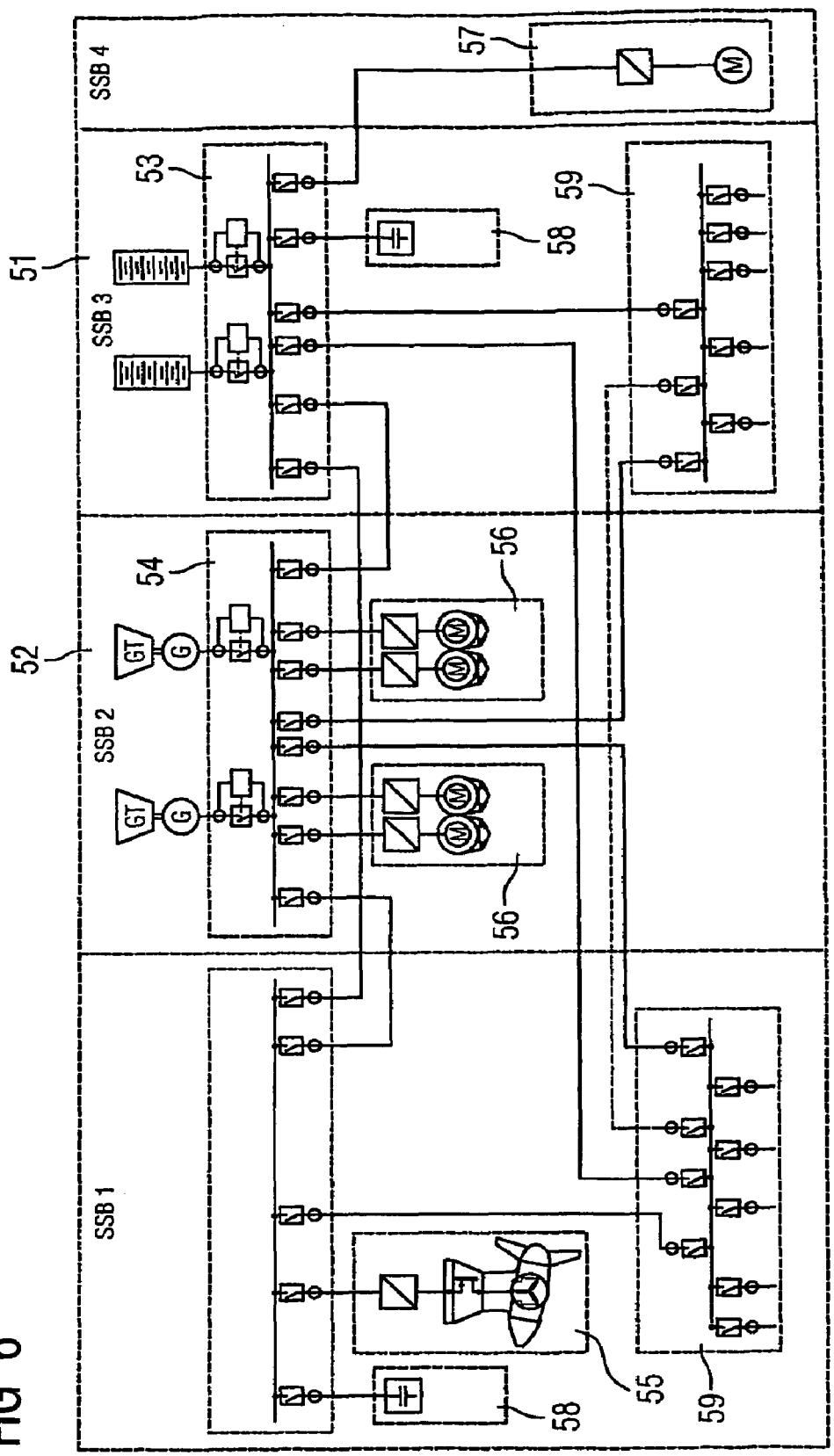
FIG. 6 shows an outline illustration of an electrical network according to at least one embodiment of the invention for a corvette.
Figure 7:
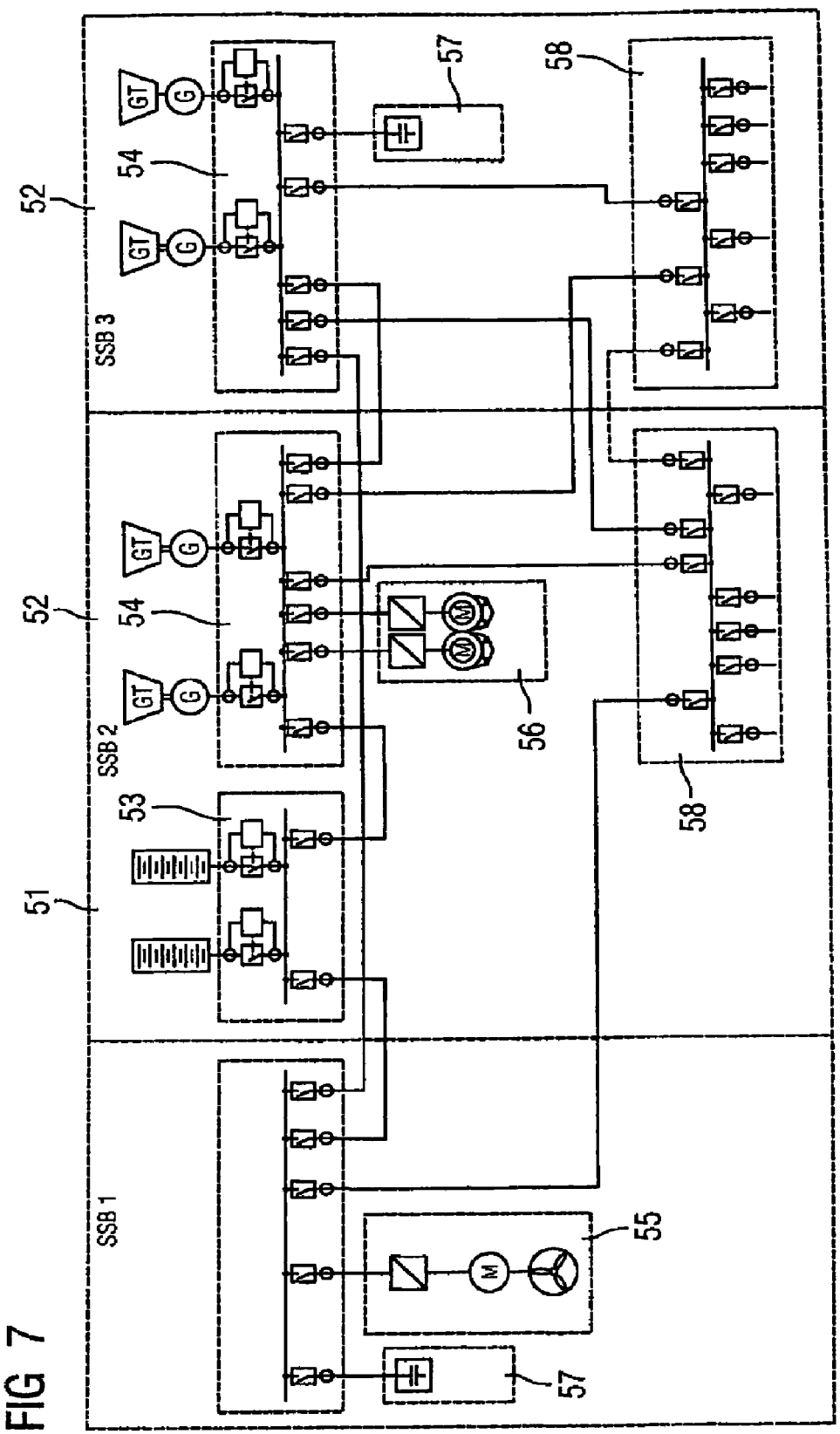
FIG. 7 shows an outline illustration of an electrical network according to at least one embodiment of the invention for a high-speed boat.
Figure 8:
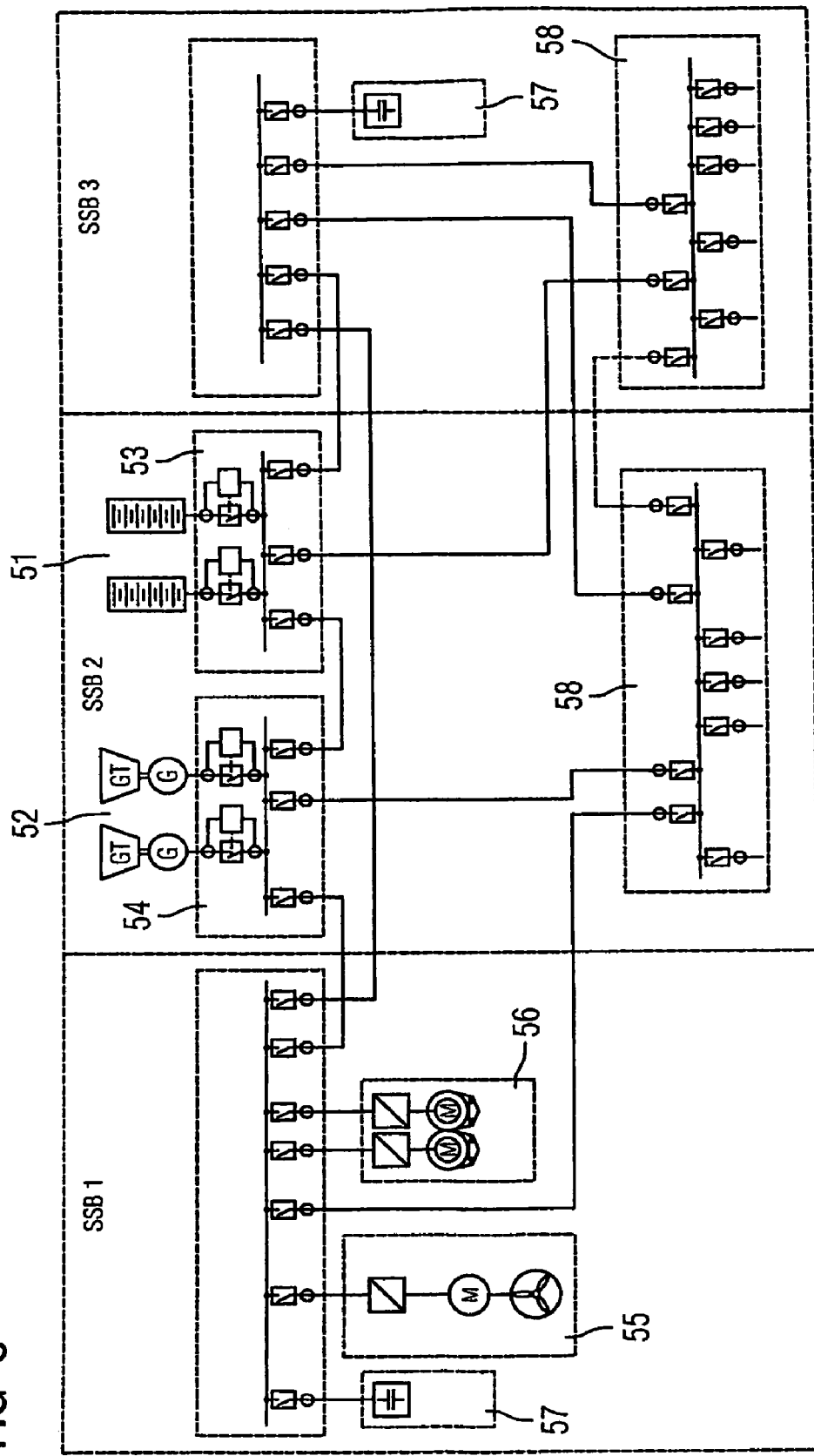
FIG. 8 shows an outline illustration of an electrical network according to at least one embodiment of the invention for a large unmanned combat boat.

FIG. 5 shows a network and a propulsion concept for a frigate; FIG. 6 shows the network and the propulsion concept for a corvette; FIG. 7 shows the network and the propulsion concept for a high-speed boat; FIG. 8 shows the network and the propulsion concept for an unmanned combat boat of a larger type, and FIG. 9 shows the network and the propulsion concept for a smaller unmanned combat boat.

In FIGS. 5 to 9, 51 in each case denotes the power generation by way of fuel cell systems, 52 the power generation by way of gas turbine generators (or else by way of diesel generators), and 53 the propulsion network, which is connected to the fuel cell, as well as 54 the propulsion network which is connected to the gas turbine generator. 55 denotes the cruise propulsion systems, 56 the very high-speed propulsion systems and 57 an auxiliary propulsion system. 58 denotes the weapon systems and 59 the electrical low-voltage systems. The individual devices are in each case arranged in vessel protection areas which are annotated SSB1, SSB2, SSB3 and SSB4.

In principle, these are the subdivisions which have already been described above and are provided with the protection components as described in detail in FIGS. 3 and 4. The size and number of the individual units and components are in each case dependent on the vessel size and, possibly, also on the specific use of the various vessels. FIGS. 5 to 9 show particularly advantageous refinements, although it is self-evident to those skilled in the art that different refinements which make use of the fundamental principles of at least one embodiment of the invention should also be included in the protection.

It is also self-evident to those skilled in the art that not only vessels with POD propulsion systems but also vessels with in-board engines or motors can be electrically equipped according to at least one embodiment of the invention.

HTS in-board motors or engines are in this case advantageously designed to have very short propeller shafts, that is to say the motors or engines are arranged in the area in which the shaft tunnel is located in conventionally equipped vessels. Use can highly advantageously be made of the low weights and small dimensions of the electric motors that use HTS technology. In this case, there is no need for the waterjet propulsion systems, or they can be replaced by special propeller propulsion systems.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A power generation, distribution and on-board electrical power supply system for low-emission surface navy vessels of various classes and sizes, comprising:
   at least one cruise propulsion system, suppliable with electrical power from a DC network; and
   at least one additional propulsion system, to be switched on when required and suppliable with electrical power from an AC network, the DC network and the AC network being configured in such a manner as to allow power to be transferred in both directions therebetween.

2. The system as claimed in claim 1, wherein the DC network has at least one fuel cell module for generation of electrical power.

3. The system as claimed in claim 2, wherein the at least one fuel cell module comprises air-breathing fuel cells which are connected to one another.

4. The system as claimed in claim 1, wherein the AC network includes at least one synchronous generator which is driven by a gas turbine to generate electrical power.

5. The system as claimed in claim 1, wherein the DC network is a 1 kV to 15 kV network.

6. The system as claimed in claim 1, wherein the AC network is a 1 kV to 15 kV/50 Hz or 60 Hz network.

7. The system as claimed in claim 1, wherein the DC network and the AC network jointly supply electrical power to an on-board network in the vessel as required.

8. The system as claimed in claim 1, wherein a DC intermediate circuit for coupling an on-board network to at least one of the DC and the AC network.

9. The system as claimed in claim 1, wherein the DC network supplies weapon and electronic systems with electrical power.

10. The system as claimed in claim 1, wherein a plurality of fuel cell modules are arranged distributed in different sections or safety zones, which are compartmentalized from one another in the navy vessel, and form a fail-safe network.

11. An system as claimed in claim 1, further comprising an electrical network, which is formed in the navy vessel, that includes current limiting appliances which are in the form of at least one of HTS (high-temperature superconductor) current limiters and semiconductor switches, and by which the reaction of voltage dips in the event of short circuits, including network elements which are not affected, is restricted to a time interval in the region of a few milliseconds, and voltage dips such as these can thus be restricted to the respectively affected network element.

12. The electrical network as claimed in claim 11, wherein the electrical network includes current limiting appliances, each of which includes at least one of an HTS current limiter, a semiconductor switch and a circuit breaker, by which it is possible to protect energy sources in the form of at least one of electrical power generation units and energy stores.

13. The system as claimed in claim 12, wherein the HTS current limiters are combined with secondary protective devices which act on the circuit breaker.

14. The system as claimed in claim 11, wherein the electrical network is in the form of a hierarchical network with current/time grading, in whose at least one of network couplings and connecting lines the current limiting appliances are arranged.

15. The system as claimed in claim 11, wherein the current limiting appliances are arranged such that current selectivity is achievable thereby, in conjunction with a configuration of the electrical network.

16. The system as claimed in claim 11, wherein the electrical network in the navy vessel is in the form of a hierarchical network with at least one of as little interconnection as possible and reaction-free interconnection.

17. The system as claimed in claim 16, wherein the reaction-free interconnection is provided by diode-decoupled feeding of at least one of DC switching systems and DC loads from two different vessel protection sections.

18. The system as claimed in claim 11, wherein of the electrical network that is formed is switchable from a normal state, in which it is an interconnected electrical network, to a special state, in which it is a hierarchical network and the effectiveness of the current limiting appliances is ensured.

19. The system as claimed in claim 11, wherein the switches include a communication device by which contact can be made with a higher-level switch, which trips without any time delay, in the event of failure of the switching device.

20. The system as claimed in claim 11, wherein the electrical network includes an automation and control device having an on-time diagnosis unit with a high computation speed.

21. The system as claimed in claim 20, wherein at least one of a sensor and a signaling unit is provided at every potential fault location, by which a current limiting appliance state which is associated with the respective fault location or a physical variable which is associated with the respective fault location is detectable and passable to the on-time diagnosis unit for the automation and control device.

22. The system as claimed in claim 21, wherein the at least one sensor and signaling unit include supplies which are independent of their fault locations.

23. The system as claimed in claim 21, wherein the connection between the on-time diagnosis unit for the automation and control device and at least one of the sensor and the signaling unit is provided by way of wire-based elements.

24. The system as claimed in claim 21, wherein the sensor includes back-up sensors which detect without the use of wires and transmit without the use of wires, with decentralized repeaters being installed in a vessel protection section.

25. The system as claimed in claim 1, wherein at least one of PEM and HT fuel cells are provided as electrical power generation units, by which direct current is suppliable to a main network in the form of a DC medium-voltage network.

26. The system as claimed in claim 1, wherein at least one of batteries, solid-state storage devices and rotating storage devices, are provided as energy stores.

27. The system as claimed in claim 1, wherein the system includes at least one of network couplings and network connecting lines, in each of which there is an HTS current limiter.

28. The system as claimed in claim 1, wherein the system includes HTS current limiters with a superconductor composed of YBaCuO compounds, which is designed using thin-film technology and uses liquid nitrogen as a cryogenic liquid.

29. The system as claimed in claim 1, further comprising outgoers in which semiconductor switches are arranged.

30. The system as claimed in claim 1, wherein the system includes a main on-board network with outgoers which connect the on-board network intermediate circuits and includes semiconductor switches.

31. The system as claimed in claim 30, wherein the on-board network of the system has main groups associated load outgoers and semiconductor switches.

32. The system as claimed in claim 1, wherein energy sources in the form of at least one of electrical power generation units and energy stores are protectable by semiconductor switches.

33. The system as claimed in claim 1, further comprising an electrical network having semiconductor switches in the form of at least one of IGCT switching elements (integrated gate commutated thyristors), GTO (gate turn-off thyristors), IGBT (insulated gate bipolar transistors) and MOS transistors.

34. The system as claimed in claim 33, wherein switching elements of the semiconductor switches, in the form of IGCTs, are protected by snubber circuits.

35. The system as claimed in claim 1, wherein the system is a standard equipment segment for navy vessels of various size, with size matching being provided in the form of at least one of network reduction and enlargement.

36. The system as claimed in claim 1, wherein POD propulsion systems are used as the cruise propulsion system.

37. The system as claimed in claim 1, wherein electrical in-board motors are used as the cruise propulsion system.

38. The system as claimed in claim 22, wherein a connection between the on-time diagnosis unit for the automation and control device and at least one of the sensor and signaling units is provided by way of wire-based elements.

39. The system as claimed in claim 22, includes back-up sensors which detect without the use of wires and transmit without the use of wires, with decentralized repeaters being installed in a vessel protection section.

* * * * *